No. 871,744. PATENTED NOV. 19, 1907.
T. VAN KANNEL.
AMUSEMENT APPARATUS.
APPLICATION FILED MAR. 9, 1907.
5 SHEETS—SHEET 2.
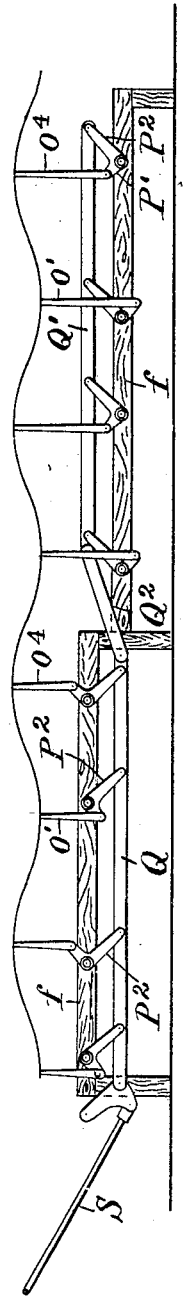
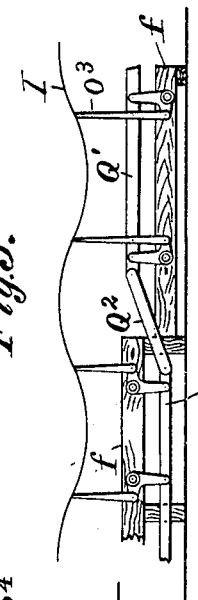
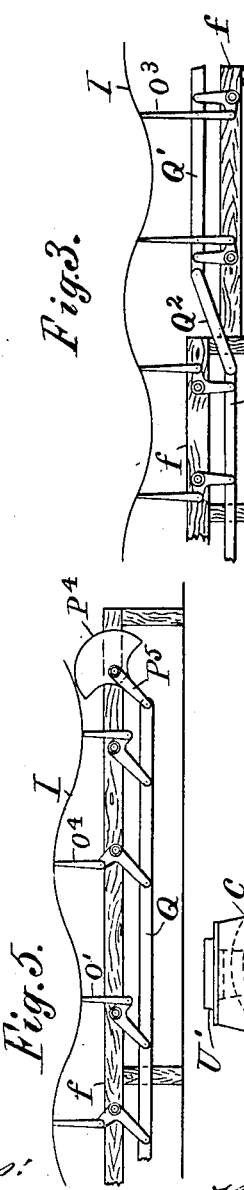
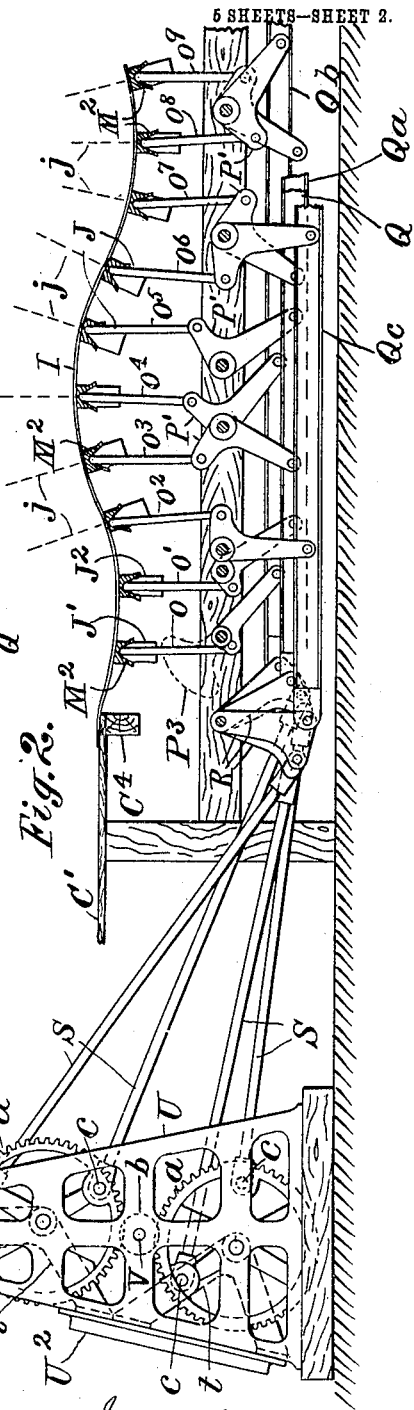
Witnesses:
L. Lee.
J. W. Greenbaum.
Inventor.
Theophilus Van Kannel,
per Thomas S. Crane, Atty.

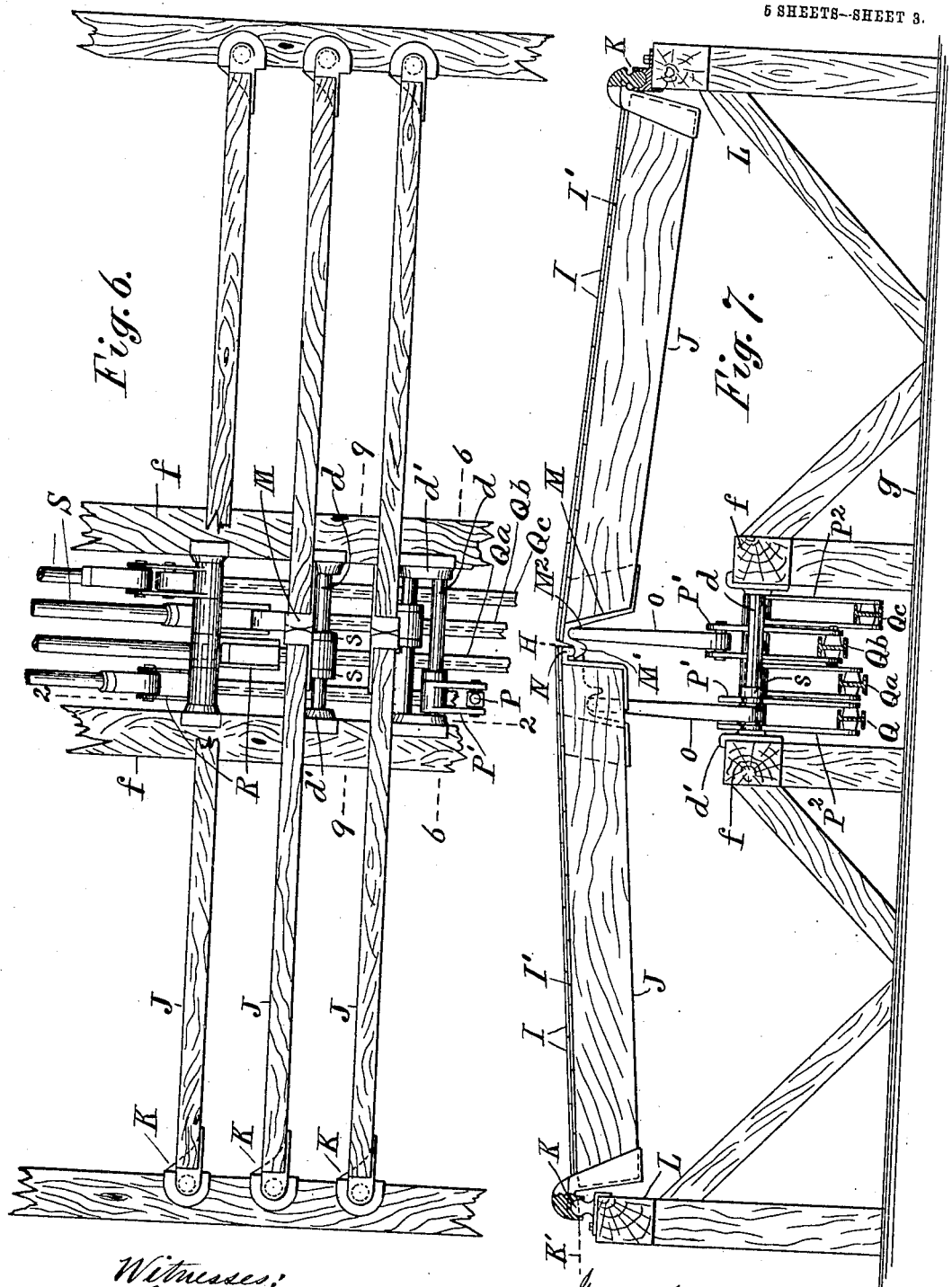

No. 871,744. PATENTED NOV. 19, 1907.
T. VAN KANNEL.
AMUSEMENT APPARATUS.
APPLICATION FILED MAR. 9, 1907.

No. 871,744.
PATENTED NOV. 19, 1907.
T. VAN KANNEL.
AMUSEMENT APPARATUS.
APPLICATION FILED MAR. 9, 1907.
5 SHEETS—SHEET 5.
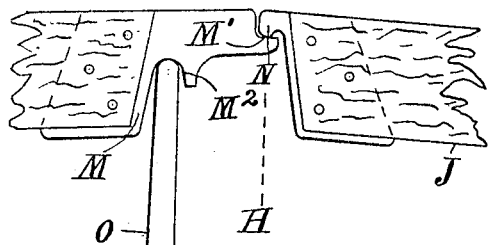
Fig. 9.
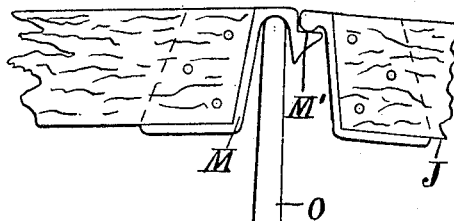
Fig. 10.
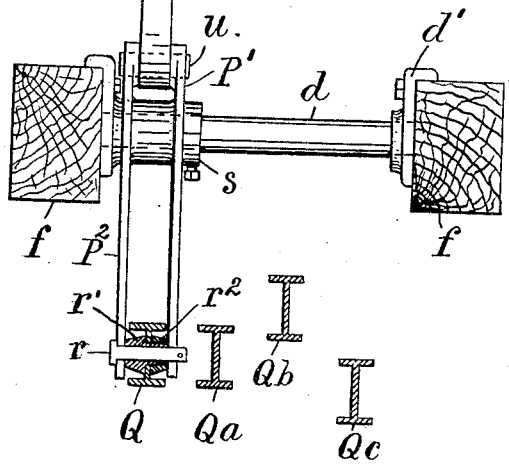
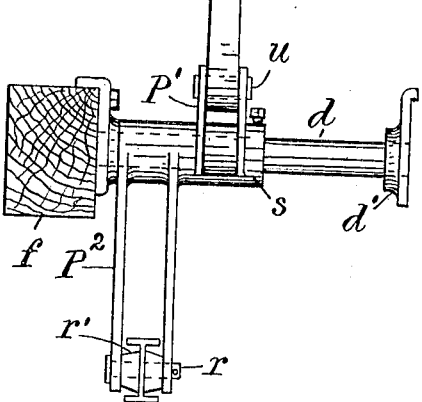
Fig. 11.
Fig. 12.
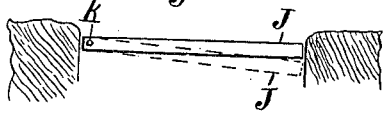
Fig. 13.
Fig. 15.
Fig. 14.
Fig. 16.
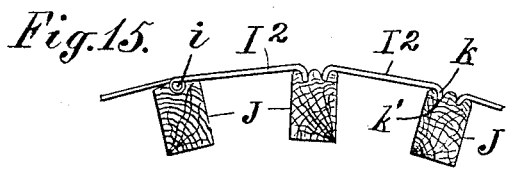
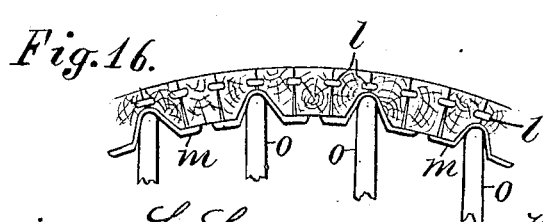
Witnesses:
L. Lee
J. W. Greenbaum
Inventor.
Theophilus Van Kannel,
per Thomas S. Crane, Atty.

UNITED STATES PATENT OFFICE.

THEOPHILUS VAN KANNEL, OF NEW YORK, N. Y.

AMUSEMENT APPARATUS.

No. 871,744.  Specification of Letters Patent.  Patented Nov. 19, 1907.

Application filed March 9, 1907. Serial No. 361,477.

*To all whom it may concern:*

Be it known that I, THEOPHILUS VAN KANNEL, a citizen of the United States, residing at 519 West One Hundred and Forty-first street, New York, county and State of New York, have invented certain new and useful Improvements in Amusement Apparatus, fully described and represented in the following specification and the accompanying drawings, forming a part of the same.

The present invention relates to certain improvements in the amusement or illusion apparatus patented by me on March 4, 1902, with No. 694,447, in which a series of progressive rising and falling movements simulating the waves of the sea are imparted to a floor of flexible material for the purpose of propelling and also agitating any conveyance or vehicle borne upon the floor. In the said patent, rotary mechanism was described to operate upon the under side of the floor or rollers attached thereto so as to impart the progressive rising and falling movements; but the present invention substitutes reciprocating lifters for such rotary mechanism, as it is found by experience that such lifters can be readily actuated by bell-cranks having a common connection to a reciprocating rod. The relatively small friction of pivots is thus substituted for the greater friction of shafts and eccentrics.

A plurality of pairs of bell-cranks is employed in a group under each wave length of the floor, and a plurality of driving-bars is jointed to the several pairs, and the bars reciprocated progressively to produce the required wave motion. The invention also provides means for neutralizing the weight of the connecting-bars. The bell-cranks under the opposed portions of each wave are reversely arranged, which wholly balances the weight of the floor-portions resting upon such cranks.

The movement of the connecting-bars is necessarily in a right line, and may be extended for any length below a continuous section of the vibrating or undulating floor, but where it is desired to place sections of the floor at an angle with one another, suitable means is used for diverting the motion of the connecting-bars at the desired angle. As the undulating floor imitates fluid waves, the surroundings of the apparatus are preferably constructed to imitate the shore of a stream, lake, or other body of water, and in practice, the apparatus is erected with two of the vibrating floors upon opposite sides of a platform or island, a space between the floors at one end being connected by so-called rapids, and the space at the opposite end having an ordinary fixed floor. The vehicles or conveyances started from an embarking station upon or near this fixed floor would progress over one of the undulating floors, then across the rapids, and then back upon the other undulating floor to a debarking station, from which the vehicles would be moved across the fixed floor to be used again at the embarking station; such fixed floor being sloped downwardly to facilitate such transfer.

The embarking station may be formed as a pier connected to the line of the shore but having also a wave motion, and the first course of the undulating floor may be formed with an upward grade of sufficient degree to afford a rapid descent or incline where the rapids are located. The conveyances would thus be able to descend the rapids by gravity to enter upon the return course also of an upward grade where they would be propelled forward by the wave motion of the floor. Such grades would afford the necessary declination of the fixed floor.

The invention embraces many details of construction which improve the durability and the operation of the apparatus, all of which will be understood by reference to the annexed drawing, in which Figure 1 is a diagrammatic plan illustrating one application of my invention; Fig. 2 is a vertical section of the floor-vibrating apparatus and the driving-gear, the view being taken on line 2—2 in Figs. 1 and 6; Fig. 3 is a diagram illustrating the balancing of the weight of the driving-bars, only one of the four bars being shown, and the cranks in their central position; Fig. 4 is a similar view showing the alternate cranks in their extreme opposite positions; Fig. 5 is a similar diagram showing the use of a lever and weight to balance a driving-bar; Fig. 6 is a plan of a part of the floor-supporting mechanism with the ends of the driving-bars; Fig. 7 is an elevation in section on line 6—6 in Fig. 6, and Fig. 8 is a vertical section, where hatched, at the centers of the crank-shafts in Fig. 2. Fig. 9 is an elevation of part of the lifting apparatus in section on line 9—9 in Fig. 6; Fig. 10 is a similar elevation showing an alternative construction for the lifter and bell-cranks; Fig. 11 is a cross section of two beams with floor-plates attached; Fig. 12 is a diagram, in vertical cross section, of a floor movable at one edge; Fig. 13 is a diagram, in vertical cross section, of a floor movable simultaneously at both edges in the same direction; Fig. 14 is a diagram, in vertical cross section, of a floor pivoted in the middle and movable in opposite directions at its opposite edges; Fig. 15 is a cross section of certain floor-beams with plates pivoted thereon to form the pliable floor; and Fig. 16 is a cross section of a floor formed of closely adjacent beams.

In Fig. 1, A designates an island, upon the opposite sides of which two undulating floors B and B' are shown connected at one end by a rapids C, and having a fixed floor C' between the opposite ends, where an embarking pier E and a debarking pier F are shown at the ends of the floors B and B'. Waves are represented by shading on the floor B' only, lines corresponding to the tops of the waves being shown on the floor B, and only the beams to support the floor-plates being shown in the floor of the rapids C. The floor B forms an advancing upwardly inclined course in which vehicles placed upon the floor are moved by the waves in the direction of the arrow G, and the floor B' forms a returning course in which vehicles are moved by the waves in the direction of the arrow G'. In passing from one course to the other, the vehicles are moved by gravity down the rapids C in the direction of the arrow $G^2$. The descent of the rapids brings the vehicles back to about the original level, and the floor B' is sloped upward in a sufficient degree to afford a slight inclination of the fixed floor toward the embarking station, so that the vehicles are readily moved to such station, when the passengers have debarked.

A line H is shown along the middle of the floor or course B, at opposite sides of which flexible plates I' are shown which form the pliable body of the floor, which rests, as shown in Figs. 5 and 6, upon a series of transverse beams J. These beams are shown in Figs. 5 and 6 jointed at their outer ends to stringers L by ball and socket joints K. The inner ends of the beams adjacent to their joint line H are provided respectively with a lifter casing M, and with a hook-casting having hook N which rests upon a seat M' upon the lifter casting. Each of the lifter castings has a downwardly projecting cup or socket, marked $M^2$ in Fig. 2, which receives the upper end of a lifter-rod o, the lower end of which is pivoted to the arm P of a bell-crank; and the other arm or leg P' of such bell-crank is jointed to a longitudinal connecting-rod Q. The lifter-rod is thus connected or attached positively to the means for reciprocating it, so as to be positively moved both upward and downward. The rod is thus actuated with the least possible friction.

By employing two sets of the beams J at opposite sides of a separating line H and jointing the outer ends of the beams upon fixed stringers, the intermediate portion of the beam is readily raised and lowered by the lifters o, and a wave motion produced upon the floor, which is imperceptible near the outer ends of the beams and is increasingly greater toward the line H. The beams having the lifter castings are supported by the lifters o and the beams having the hook-castings are supported by the seats upon the lifter castings, so that the lifter sustains and moves the adjacent ends of the beams simultaneously.

The beams are jointed at their outer ends by ball and socket joints so that they may not only rise at their adjacent ends but may tip at different angles, as indicated by the dotted lines $j$ in Fig. 2, and to prevent any extension or stretching of the floor-plates under such rocking motion, the tops of the beams which support the floor-plates are placed on a line with the centers of the balls so as to locate the upper surface of beams at the center of motion, which permits them to rock without approaching to or receding from one another at the surface which supports the plates.

The floor-plates are attached to the beams when the beams are set at the respective locations required to form the contour of the wave, and the plates are not thereafter stretched by the movements of the beams, as any extension of the plate in one direction is neutralized by an equal retracting in an opposite direction. The lifters are jointed at their lower ends upon their respective bell-cranks, and their upper ends are thus free to rock, permitting the beams to move laterally in any degree that may be demanded by the movement of the floor-plates.

Fig. 2 shows the transverse section of the lifter sockets $M^2$, and a single wave length of the floor supported by eight of the lifters, marked $o'$, $o^2$, $o^3$, $o^4$, $o^5$, $o^6$, $o^7$, $o^8$, respectively. The lifters $o'$ and $o^8$ are shown under the widest part of the wave and the lifters $o^4$ under the highest part; and to produce the required undulating movement, the lifters $o^4$ to $o^8$ are progressively raised, while the lifters $o'$ to $o^4$ are progressively lowered. To produce such movement, the bell-cranks one-half of a wave length apart as $o^2$ and $o^6$, are connected to the same driving-bar Q, and other pairs of lifters one-half of a wave length apart are connected to other driving-bars $Q^a$, $Q^b$ and $Q^c$; the four pairs of lifters under the successive waves throughout the length of a floor being connected with the same four driving-bars.

To balance the weights imposed upon the various bell-cranks and thus diminish in the greatest degree the power required to undulate the floor, the lifters which are one-half of a wave length apart as $o'$ and $o^5$ are supported by bell-cranks whose arms P project in opposite directions, while their legs P' are jointed with the same driving-bar and the weight of floor above such lifters is thus transmitted to the connecting-rod in opposite directions and the weights are balanced and offer no resistance to the movement of the rod. The lifters $o^2$ and $o^6$ have their arms likewise reversed and are connected to the driving-bar $Q^a$, the lifters $o^3$ and $o^7$ are similarly reversed and their legs connected to the driving-bar $Q^2$, and similarly the lifters $o^4$ and $o^8$ are connected to the driving-bar $Q^c$.

The balancing of the weights by reversing the arms of the bell-cranks is clearly shown in Fig. 3, where only two pairs of the lifters are shown with the bell-cranks in their central position, and the tops of the lifters therefor all at the same level. Fig. 3 also illustrates the balancing of the weights of the driving-bars, which must necessarily rise when the legs of the bell-cranks are swung through an arc as indicated in Fig. 2, and which would require the consumption of power to lift them in such swinging movement.

To neutralize the weight of the driving-bar, I divide it in half at the middle of its length and project the legs of the bell-cranks upwardly where connected with one-half of the driving-bars (as indicated at the right hand side of Fig. 3) and connect the two halves Q, Q' of the driving-bar by a link $Q^2$. The driving-bar for the bell-cranks in the first half of any series of waves thus rises as the legs of the bell-cranks swing from the vertical line; while the driving-bar connected with the second half of the series falls to the same extent, the rising and falling being simultaneous and proportional in all positions of the bell-cranks. Such rising and falling is illustrated in Fig. 4, where four waves are shown with the eight lifters operating under the wave at one-half of a wave length apart.

A rocker R is shown connected to the left hand of each of the driving-bars in Fig. 2, and a connecting-rod S for oscillating the same to reciprocate the driving-bars successively by gearing which will be hereinafter described. The gearing reciprocates the connecting-rods and driving-bars successively, and thus gives the bell-cranks the progressive motion required to produce the wave motion of the undulating floor by means of the lifters. Instead of projecting the legs of the bell-cranks in reverse directions and dividing the driving-bar as shown in Fig. 3, the weight of the driving-bar may be neutralized by suitable weights attached to the hubs of the bell-cranks and projected upon the side opposite to the leg. All of the bell-cranks in Fig. 2 could thus be provided with balance weights, but only one such weight is shown ($P^2$) to avoid confusion with the other parts of the figure. Such weights would move at one side of the lifter-rod and avoid interference with the beams and lifter-sockets. Each bell-crank may be thus provided with a means to balance the portion of the driving-bar to which it is attached. A lever $P^3$ carrying a weight $P^4$ may be connected to any of the driving-bars as shown in Fig. 5, and the weight $P^4$ proportioned to balance the weight of such driving-bar, by its projection from the opposite end of the lever.

To connect the undulating floor with a stationary floor, a few of the pivoted beams adjacent to the edge of the fixed floor may have a lesser motion than those beams which have the normal wave movement. This is effected as shown in Fig. 2 where the edge $C^4$ of the fixed floor is shown, with the floor-plates I extended over and secured to the same, and the two beams J', $J^2$, adjacent to such fixed floor connected by lifters $o$, $o'$, with bell-cranks having arms shorter than the remaining bell-cranks in Fig. 2, and graduated to produce an increasing movement of the undulating floor in proportion to its distance from the fixed floor $C^4$, until the whole wave motion is attained, which is effected by the lifters beyond the lifter $o'$. A vehicle advancing from the fixed floor upon the undulating floor is thus subjected to gradually increasing vibrations until it rests upon the floor over the lifters $o^2$, $o^3$, &c.

The arms and legs of the bell-cranks are preferably forked or made with double plates as is clearly shown in Figs. 6, 7, 9 and 10, so that the pivots $u$ (Fig. 9) of the lifter-rods P may be supported at both ends, and the pins $r$ which connect the legs $P^2$ to the driving-bars may in like manner be supported at both ends. A tee-bar as indicated by the sections in Figs. 7 and 9, is preferably used for the driving-bars, as it possesses great stiffness in proportion to its weight; and extended bearings for the pivots $r$ of the legs $P^2$ are formed in the driving-bars by means of bushings $r'$ extended each through a hole in the plate of the tee-bar and shouldered upon one end to fit such plate, and having a collar $r^2$ secured upon the opposite end to hold the bushing upon the plate. The opposite ends of the bushing project a little beyond the flanges of the tee-bar so as to hold the two plates of the leg $P^2$ clear from the edges of the bar. It is immaterial how the collar $r^2$ be secured upon the bushing, whether by screw-thread or a pin, as the essential feature of this element is the furnishing of a long bearing for the pivot-pin where it extends through the plate of the tee-bar, so as to give it strength and durability. The shafts $d$ are made more rigid by having them fixed securely in their bearings upon the girders $f$, and permitting the bell-cranks to rock upon them; collars $s$ being applied, as shown in Figs. 6, 9 and 10 to hold the bell-cranks in their respective places upon the shafts.

A crank-gearing is shown for reciprocating the driving-bars with a particular construction to produce the successive movements of four crank-pins so as to reciprocate the driving-bars successively and avoid the use of a bent crank-shaft in producing a consecutive movement of all the cranks. This is accomplished by mounting each crank-pin $c$ upon two crank-disks with teeth upon the margin of each disk, and pinions rotating the disks in unison, so as to support both ends of each crank-pin equally in its circular motion. By a suitable arrangement of bearings, any number of such disks may be mounted upon the same axis; but I find it advantageous, in reciprocating four connecting-rods to place four of the disks for operating two of the crank-pins below the driving pinions and four disks for operating the other two crank-pins above such pinions.

Figs. 7 and 8 show the disk-shafts $T$, $T'$, mounted in a stand $U$, with the pinion-shaft $V$ intermediate to the same. The stand has two side-frames tied together by top-plate $U'$ and side-plate $U^2$. Pulleys $V'$ are shown upon the pinion-shaft to rotate it, but a directly connected electric motor or other means may be employed. Each of the disk-shafts is divided at two points to permit the movement of the connecting-rods $S$ across the center of the disk, the middle section $T'$ of each shaft being carried by a bearing $t$ or $t'$ extended inward from the plate $U'$ or $U^2$ on the edge of the stand. Each end section of the shaft $T$ has one toothed disk $a$ attached thereto, and the middle section $T'$ has two of the toothed disks attached, and crank-pins are extended between the disks $a$ and $a'$, and secured therein by nuts $a^2$ upon their ends. The teeth upon the peripheries of the disks $a$ and $a'$ mesh with pinions $b$ upon the pinion-shaft $V$ so that they all rotate simultaneously, and the crank-pins $c$ are set in such a relation to one another upon the several disks that the connecting-rods $S$ are reciprocated successively and actuate the bell-cranks in the desired progressive order.

It will be evident from inspection of Fig. 8, that the force required to reciprocate the connecting-bars $S$ is applied more directly by means of the several disks, which are driven by the teeth upon their periphery, than could be done by a bent crank driven from one or both ends. The construction is also much cheaper than a crank bent four times to operate four connecting-rods, and permits, by meshing the pinions with the disks in any desired position, of changing the relations of the several crank-pins to one another, so as to produce the desired successive movements of the driving-bars. It will be observed that each crank-pin is secured in two of the disks, and that such disks carry none of the other crank-pins, but are rotated independently by pinions upon the pinion-shaft $V$; which permits each pair of disks, carrying one crank-pin, to be adjusted in relation to any of the others. It will be understood that where two pairs of the disks are used upon the same axis, an intermediate bearing $t$ or $t'$ is required for the intermediate portion $T'$ of the disk-carrying shaft; but such bearing, as shown in Figs. 7 and 8, may be firmly supported upon the frame, so as to hold the disks $a'$ concentric at all times with the disks $a$. The plates $U'$ and $U^2$ upon the edges of the gear-stand furnish firm supports for such bearings.

Where a plurality of connecting-rods is used, they necessarily lie side by side as shown in Figs. 6, 9 and 10, and the bell-cranks actuated by each of such rods must necessarily oscillate in the same plane upon their respective shafts $d$. Such shafts are shown in Figs. 6 and 7 mounted in journal-bearings $d'$ upon girders $f$ which are sustained upon a foundation $g$ below the adjacent ends of the beams $J$. Such bell-cranks cannot, owing to their connection with the several driving-bars, all lie beneath the joint $H$ of the floor-beams, and the sockets $M^2$ in the socket castings $M$ may therefore be made at different distances from the line $H$, or the arm $P'$ of the bell-crank be attached to the hub at one side of the leg $P^2$. In Fig. 7, one of the sockets $M^2$, that drawn in section, is shown close to the line $H$, while another indicated in dotted lines is at a considerably greater distance from said line, to receive a lifter extended upward from one of the bell-cranks adjacent to the bearing $d$; and Fig. 9 shows such a socket and bell-crank dissociated from the adjacent sockets and bell-cranks. Fig. 10 shows the alternative construction with an elongated hub upon the bell-crank having the arm $P'$ at one side of the leg $P^2$, so that its lifter is in line with a socket close to the line $H$. Any other suitable means may be employed to actuate the bell-cranks in several different planes and to connect their lifters suitably with the sockets in the lifter castings upon the floor-beams. The floor-plates are in practice made of pliable steel sheets, in two thicknesses $I$, $I'$, with the two sheets arranged to break joints as shown in Fig. 1, the inner plates $I'$ being attached to the beams are shown by screws $e$ in Fig. 11, and the outer plates attached to the inner ones by bolts and nuts $e'$. Instead of extending floor-plates across a plurality of the beams and attaching them thereto, the space between each pair of beams may be covered by a separate plate $I^2$, as shown in Fig. 15, the plates being hinged together at their edges as indicated at *i*, or formed with ribs *k* upon their edges fitted to grooves *k'* in the tops of the beams.

The apparatus may be constructed without any floor-plates, by making the beams of wedge-shape and setting them close together in a continuous series as shown in Fig. 16, with dowels *l* in their adjacent edges to keep them in conjunction. In such construction, each beam would have a ball and socket joint at one end, and they would be connected in groups of three or four at their movable ends, with a lifter casting having a flange *m* extended beneath such group and provided with the socket for the top of the lifter, which thus operates to raise the beams successively as desired.

Vehicles or conveyances of any kind, as boats, imitation horses on wheels, velocipedes, imitation automobiles, and any other structures running on wheels may be used with this undulating floor, the progressive motion of the waves operating automatically to propel such vehicle upon the floor, and the vehicles requiring merely a steering mechanism to guide them in their path around the different courses, and a brake to arrest them.

When the vehicles are placed upon the floor at the embarking pier, they are tied to the pier or held by their brakes, but may be subject to the rocking motion of the floor as the passengers embark, and the vehicle, being then released, is propelled by the waves over the course B, from which it is steered by the operator on to the rapids C. It then moves over the rapids by gravity, and after passing over the same is steered on to the returning course B', where it is propelled by the waves, and is guided to the debarking pier F, where it is again secured while the passengers disembark. The vehicle is then shifted by hand to the embarking pier, each movement being aided by the declivity of the fixed floor C'.

The alternating inclinations of the floors B, B' and C, create a considerable variety of the movement of the vehicles, a variation in the grade being made between the floor B and rapids C, as the floor is much longer than the rapids, and a gradual ascent of such floor suffices to afford a very descending grade to the apparatus. The course B' may thus be made adjacent to the rapids at nearly the same level as the embarking point, and thus require but a slight grade upwardly to the pier F to procure a sufficient downward grade upon the floor C' to facilitate the shifting of the unloaded vehicles across such floor.

The wave motion of the rapids is preferably made of variable character at different parts of the rapids to produce short choppy waves, and the floor-beams are hinged at their outer ends $C^2$ and are vibrated up and down at their inner ends $C^3$; thus producing a very different motion from that upon the floors B and B', and creating a greater variety of effect on the different vehicles.

The floor-beams of the rapids are made divergent toward their fulcrum ends, so that the rapids are longer at that end than next the island, which produces a much steeper grade adjoining the island, where the vibrations are the greatest, and thus causing the vehicles to travel faster and experience a much greater vibration if directed along the inner side of the rapids.

It will be understood that there is no motion at the edges of the floors B and B', and that the motion increases toward the middle line H of each of such floors, and the guiding of the vehicles, by suitably steering them, enables the operator to vary the experience of the passengers and to subject them to a great variety of the wave motions.

Owing to the divergence of the beams which support the rapids, the floors B, B', make an oblique junction with the ends of the rapids, and to blend together the motions of the side floors and the rapids, the beams $J^3$ which support the end portions of the side floors are extended from their fulcrums at the outer ends directly to the terminal beams $H^2$ of the rapids, where they are suitably jointed to such beams and participate in their movement, which facilitates the transfer of the vehicles smoothly from the floor to the rapids, or vice versa.

It is immaterial to the other features of the invention which are claimed herein how the beams which support the floor are fulcrumed or guided in their vibrating movements, as the means which I have shown may be applied to one end, or both ends of the beam, and the beam may be pivoted at one end or at the middle, or supported wholly by the lifters.

Fig. 12 shows diagrammatically the pivoting of the beams as used for the floors B, B', and rapids C in Fig. 1, the fulcrum $k^2$ being placed at one end of the beam J which is indicated in full lines in one position and in dotted lines in another position.

Fig. 13 illustrates the floor-beams $J^4$ movable in parallel lines, by applying simultaneously operating lifters to both ends, the beam being shown in full lines in its raised position, and in dotted lines in its lowered position.

Fig. 14 shows a beam pivoted at the middle, and a lifter connected with either end would thus operate to vibrate the opposite ends in reverse directions. The means for vibrating or undulating the floor may thus be used with any arrangement of floor-beams to which it is adapted.

Figure 1:
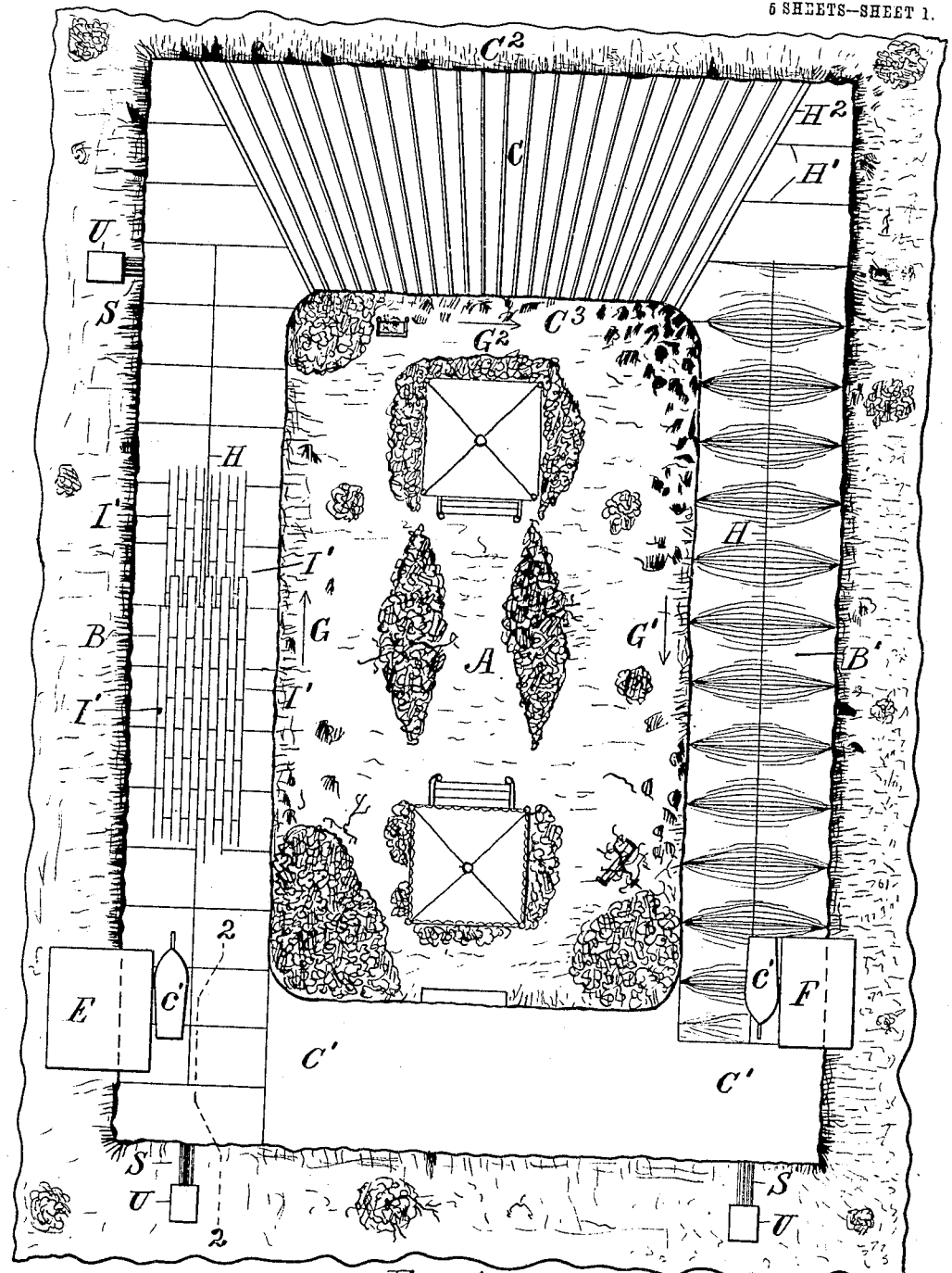
Figure 8:
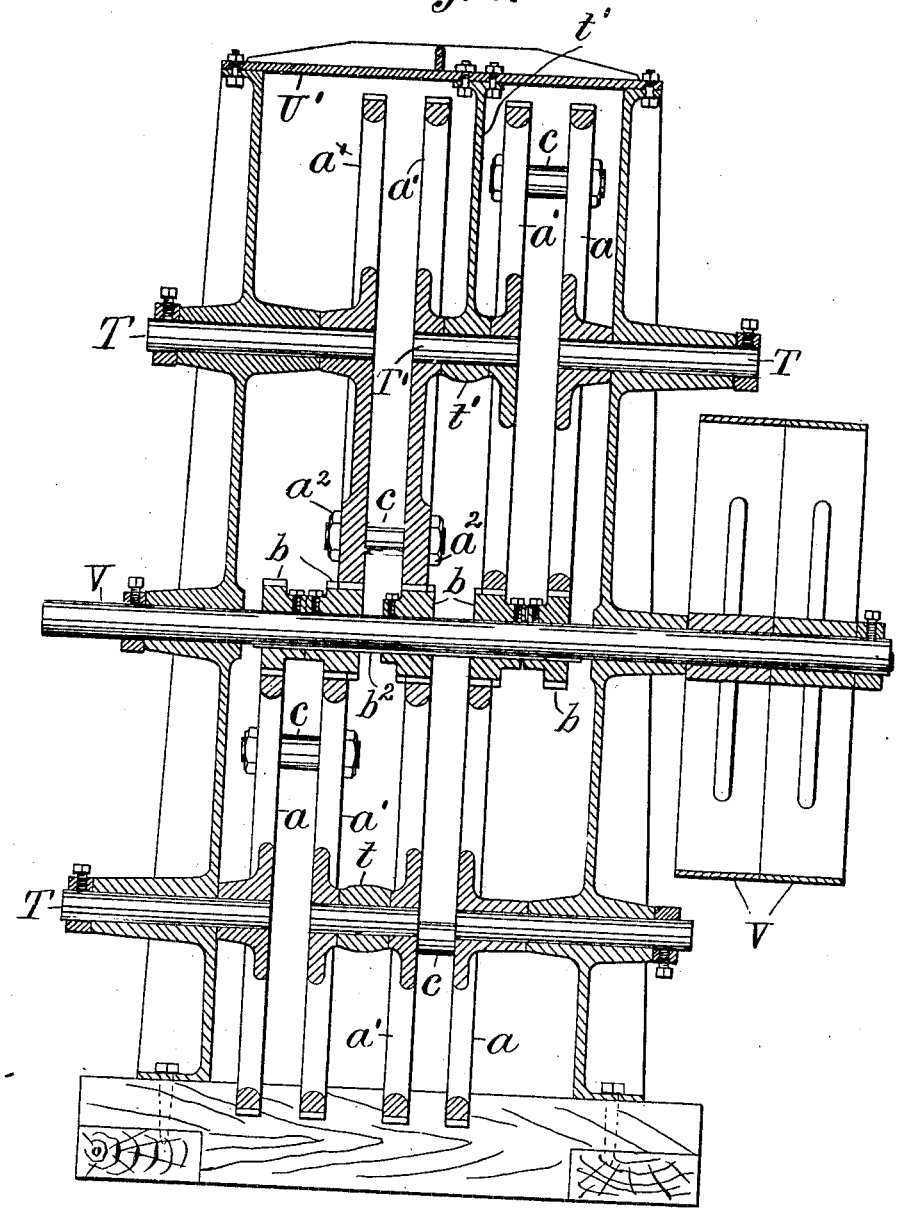

My present invention is necessarily tributary to my above named prior patent No. 694,447, as I have claimed broadly therein means for imparting to a flexible floor a series of longitudinally progressive rising and falling movements.

Having thus set forth the nature of the invention what is claimed herein is:

1. In an amusement apparatus, the combination, with a pliable floor, of a series of adjacent pivoted beams supporting the floor with a lifter-socket below the inner end of each beam, a lifter-rod movable vertically under the said socket, and means for reciprocating the lifter rod attached directly and positively to the lower end of the rod, to actuate the rod positively both upward and downward.

2. In an amusement apparatus, the combination, with a pliable floor, of a series of adjacent pivoted beams supporting the floor, a lifter-rod movable vertically under the end of each beam, a bell-crank connected with each lifter-rod, and a series of bars connected to the said bell-cranks and reciprocated to lift the rods progressively.

3. In an amusement apparatus, the combination, with a pliable floor, of a series of adjacent pivoted beams supporting the floor, a lifter-rod movable vertically under the end of each beam, a bell-crank connected with each lifter-rod, such bell-cranks forming a group under each wave length of the floor, and a plurality of bars connected to the bell-cranks of each group and operated successively to lift the rods progressively to produce a wave-motion of the floor.

4. In an amusement apparatus, the combination, with a pliable floor, of a series of adjacent pivoted beams supporting the floor, a lifter-rod movable vertically under the end of each beam, reversely arranged bell-cranks supporting such lifter-rods in pairs, whereby the loads upon such rods are balanced, and means for progressively operating the bell-cranks to produce a wave-motion of the floor.

5. In an amusement apparatus, the combination, with a pliable floor, of a series of adjacent pivoted beams supporting the floor, a group of such beams supporting each wave length of the floor, a lifter-rod movable vertically under the end of each beam, a plurality of pairs of reversely arranged bell-cranks supporting the lifter-rods of each group in pairs, and a plurality of bars each connected to a pair of the reversely disposed bell-cranks in each group and such bars reciprocated progressively to produce a wave-motion of the floor.

6. In an amusement apparatus, the combination, with a pliable floor having its surface bent into a series of waves, of a series of adjacent pivoted beams supporting the floor, a group of such beams supporting each wave length of the floor, lifter-rods movable vertically under the beams at half a wave length apart in said series with reversely arranged bell-cranks supporting such lifter-rods, whereby the weights upon the rods are balanced, the vertical arms of the bell-cranks in one-half the series pointing upwardly and the other half downwardly, bars connecting the bell-crank arms which are extended upwardly and other bars connecting those extended downwardly, with a link jointed to such bars, whereby the weights of the bars for such series of waves are opposed to one another and also balanced.

7. In an amusement apparatus, the combination, with a pliable floor, of a series of adjacent pivoted beams supporting the floor, a lifter-rod movable vertically under the end of each beam, a forked bell-crank with fork embracing the lower end of each lifter, a thin wrought bar connecting the arms of the bell-cranks with a bearing inserted in such bar to joint with the bell-crank, and the forked arm of the bell-crank embracing such bearing and jointed thereto by a through-bolt.

8. In an amusement apparatus, the combination, with a pliable floor, of a series of adjacent pivoted beams supporting the floor, a lifter-rod movable vertically under the end of each beam, bell-cranks rocking all in the same plane connected with such lifter-rods, and a pair of girders underneath the ends of the beams with fulcrum shafts for the bell-cranks journaled transversely between the said girders.

9. In an amusement apparatus, the combination, with a pliable floor, of a series of adjacent pivoted beams supporting the floor, a lifter-rod movable vertically under the end of each beam, bell-cranks rocking all in the same plane connected with such lifter-rods, and a pair of girders underneath the ends of the beams with journal bearings at the opposite sides of each bell-crank, and fulcrum-shafts for the bell-cranks journaled in the said bearings.

10. In an amusement apparatus, the combination, with a pliable floor, of a series of adjacent pivoted beams supporting the floor, an even number of such beams forming a group under each wave length of the floor, a lifter-rod movable vertically under the end of each beam, a plurality of pairs of reversely arranged bell-cranks supporting in pairs the lifter-rods at half a wave length apart, a girder underneath the ends of the beams at each side of the bell-cranks with journal-bearings at the opposite sides of each bell-crank, fulcrum-shafts for the bell-cranks journaled in the said bearings, a plurality of bars each connected to a pair of reversely arranged bell-cranks and means for operating the bars successively to impart motion progressively to the lifter-rods.

11. In an amusement apparatus, the combination, with a pliable floor, of a series of adjacent beams supporting the floor, with an even number of such beams supporting each wave length of the floor, a lifter-rod under the movable end of each beam, a series of connecting-rods arranged side by side and reciprocated transversely to the beams, with bell-cranks connecting the said rods to the lifter-rods one-half a wave length apart, and a portion of the bell-cranks having offset arms to bring the lifter-rods of such bell-cranks in line with other lifter-rods.

12. In an amusement apparatus, the combination, with a pliable floor, of a series of adjacent beams supporting the floor, a stringer at one end of the beams with ball and socket joint on a line with the top of the beam, means at the opposite end of the beam for holding the lifter-rod in conjunction therewith, and a lifter-rod supported thereunder and provided with means for reciprocating it to vibrate the beam.

13. In an amusement apparatus, a double pliable floor movable vertically at its middle joint and comprising two series of adjacent beams with the separate floors laid thereon at opposite sides of such joint, the beams being pivoted at their outer ends and supported one upon the other at their adjacent ends, and means for vibrating the adjacent ends of the supporting beams to produce a progressive wave motion.

14. In an amusement apparatus, a double pliable floor movable vertically at its middle joint and comprising two series of adjacent beams for supporting the floor with stationary stringers for sustaining their outer ends and ball and socket joints on a line with the tops of the beams, means for supporting the adjacent ends of the beams one upon the other, and means for progressively vibrating the movable ends of the supporting beams to produce a progressive wave motion of the floor.

15. In an amusement apparatus, a double pliable floor movable vertically at its middle joint and comprising two series of adjacent beams with the floors laid thereon, the beams being pivoted at their outer ends and provided at their opposed ends one with a lifter casting having a socket upon the under side and a projecting seat, and the other with a hook casting having a hook to rest upon said seat, lifter-rods fitted to the said sockets and means for reciprocating the same progressively to impart a wave motion to the floor.

16. In an amusement apparatus, the combination, with a pliable floor having a series of adjacent pivoted beams supporting the floor, and a series of connecting-rods reciprocated transversely below the beams, with connections to vibrate the beams progressively to produce a wave movement of the floor, a crank-pin and connecting-rod for reciprocating each of the connecting-bars, each crank-pin being mounted upon two gear-disks, with a pair of journals and bearings for supporting such disks and toothed pinions operating to turn the disks of each pair simultaneously to propel the crank-pins.

17. In an amusement apparatus, the combination, with a pliable floor having a series of adjacent pivoted beams supporting the floor, and a series of connecting-bars reciprocated transversely below the beams with connections to vibrate the beams progressively to produce a wave movement of the floor, a crank-pin and connecting-rod for reciprocating each of the connecting-rods, a gear-stand supporting two gear-disks for each of the said crank-pins, the disks having journals and the gear-stand having bearings fitted to such journals, a pinion-shaft mounted in such gear-stand and pinions upon such shaft meshing with the peripheries of all the gear-disks to rotate them in unison, and to operate the connecting-rods progressively as required.

18. In an amusement apparatus, the combination, with a pliable floor having a series of adjacent pivoted beams supporting the floor, and a series of connecting-rods reciprocated transversely below the beams with connections to vibrate the beams progressively to produce a wave movement of the floor, a crank-pin and connecting-bar for reciprocating each of the connecting-rods, a gear-stand having side-frames, and a pinion-shaft extended across said frames, bearings upon the frames above and below the pinion-shaft, journals fitted to such bearings in pairs with gear-disks mounted upon said journals in pairs, two pairs at each side of the pinion-shaft, and the crank-pins fitted thereto, pinions upon the pinion-shaft meshing with all of the gear-disks to rotate them in unison, and tie-plates extended across the top and one side of the stand-frames with the middle bearing for the gear-disk journals extended to such tie-plates and supported thereby.

19. In an amusement apparatus, the combination, with a pliable floor having a series of adjacent pivoted beams supporting the floor and a series of connecting-rods reciprocated transversely below the beams with connections to vibrate the beams progressively to produce a wave movement of the floor, a crank-pin and connecting-bar for reciprocating each of the connecting-rods, a gear-stand having side-frames with a pinion-shaft extended across the same, gear-disks journaled upon the frame above and below such pinion-shaft and driven thereby in pairs each pair carrying one of said crank-pins, and all of the connecting-bars converging toward the ends of the connecting-rods with rockers having journals supported adjacent to the ends of such bars and pins connecting each rocker to one of said connecting-bars and connecting-rods.

20. In an amusement apparatus, the combination, with a pliable floor having a progressive wave motion, of a second pliable floor connected thereto and having a descending grade to produce an imitation of a rapids, and the pliable floor of such rapids being oscillated vertically.

21. In an amusement apparatus, the combination, with a pliable floor having an upward grade and a progressive wave motion, of a second pliable floor connected thereto and having a descending grade to simulate a rapids, the pliable floor of such rapids having a wave motion imparted thereto of irregular character and different from the wave motion of the primary floor.

22. In an amusement apparatus, the combination, with a double pliable floor having stationary pivots at its edges and movable vertically at its middle joint, of a second pliable floor connected thereto and having a descending grade to simulate a rapids, the floor of such rapids having stationary pivots at one edge and movable vertically at the opposite edge, and means for imparting a progressive wave motion to the first floor at its middle joint, and to the second floor at one edge of the same.

23. In an amusement apparatus, the combination of three pliable floors having a progressive wave motion, the first course B having an ascending grade and a progressive wave motion, the second course C connected at an angle thereto and having a descending grade, and the third course B' connected at an angle to the end of the second course and having an ascending grade, as and for the purpose set forth.

24. In an amusement apparatus the combination, of three pliable floors having a progressive wave motion, the first course B having an ascending grade, the second course C extended from one end thereof at right angles, and made longer upon its outer edge than upon its inner edge, and the third course B' extended at right angles from the second course, the other ends of the first and third courses being connected by a rigid floor, as and for the purpose set forth.

25. In an amusement apparatus, the combination, with two parallel double pliable floors B, B', each movable vertically at its middle joint and having two series of supporting beams with fulcrum supports at their outer ends, of the transverse pliable floor C with supporting beams having fulcrums at their outer ends and movable vertically at their inner ends, and their outer ends set farther apart than their inner ends and thus at an angle with the joints H of the two parallel floors, the portions of the parallel floors which join the transverse floor having single supporting beams jointed at their outer ends and attached at their inner ends to the terminal beams of the transverse floor.

26. In an amusement apparatus, the combination, with a pliable floor, of means for connecting portions of the floor with other similar portions to balance the weight of such portions, and means for reciprocating the connecting means, whereby a wave motion is imparted to the floor without actually lifting the weight of the floor.

27. In an amusement apparatus, the combination with a pliable floor, of a series of adjacent pivot-beams supporting the floor, a lifter-rod movable vertically under the end of each beam, means connecting the lifter-rods under certain portions of the floor with the lifter-rods under other portions whereby the portions are balanced against one another, and a reciprocating driving-bar for reciprocating such "connecting means" and imparting a progressive wave motion to the floor.

In testimony whereof I have hereunto set my hand in the presence of two subscribing witnesses.

THEOPHILUS VAN KANNEL.

Witnesses:
 JAMES B. F. MAHER,
 FRED FIEN.